United States Patent [19]

Morgan

[11] 4,069,285
[45] Jan. 17, 1978

[54] METHOD AND APPARATUS FOR MAKING FLAT TOP BUNS

[75] Inventor: Charles W. Morgan, Rolling Hills, Calif.

[73] Assignee: United Foam Corporation, Compton, Calif.

[21] Appl. No.: 736,142

[22] Filed: Oct. 27, 1976

[51] Int. Cl.² .......................... B29D 7/02; B29D 27/04
[52] U.S. Cl. ..................................... 264/51; 264/45.8;
       264/46.2; 264/54; 264/165; 264/216; 264/316;
       425/4 C; 425/89; 425/817 R
[58] Field of Search ................. 264/45.8, 46.2, 51,
       264/54, 216, 165, 316; 425/4 C, 89, 817 R

[56] References Cited

U.S. PATENT DOCUMENTS

| | | | |
|---|---|---|---|
| 3,091,811 | 6/1963 | Hackert | 264/DIG. 84 |
| 3,719,734 | 3/1973 | Petzetakis | 264/54 |
| 3,768,937 | 10/1973 | Haga et al. | 264/51 |
| 3,809,512 | 5/1974 | Blackwell et al. | 264/46.2 |

*Primary Examiner*—Willard E. Hoag
*Attorney, Agent, or Firm*—Blakely, Sokoloff, Taylor & Zafman

[57] ABSTRACT

A method and apparatus for making flat topped foamed buns (e.g. polyurethane) in a continuous foaming process. The method comprises the guiding of a continuous thin film tubular member through gathering devices adjacent the cream line at each side of a conveyor, and subsequently guiding the tubular members upward along guides at an angle and rate determined in accordance with the rate of longitudinal travel and the rate of rise of the foaming reactants so as to encourage the sides of the bun into the same height of rise as the center region of the bun. Continuous slitting of the tubular members at the appropriate elevation allows the material thereof to progress longitudinally with the cured bun.

36 Claims, 17 Drawing Figures

U.S. Patent   Jan. 17, 1978   Sheet 1 of 4   4,069,285
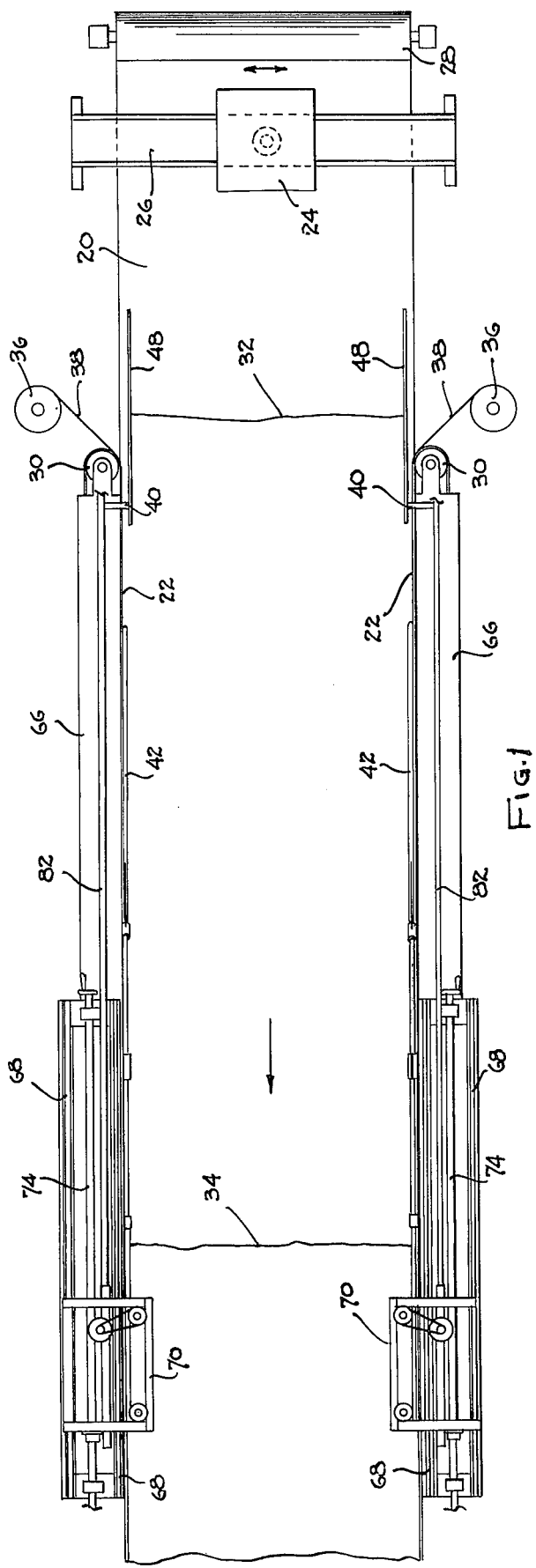
Fig. 1
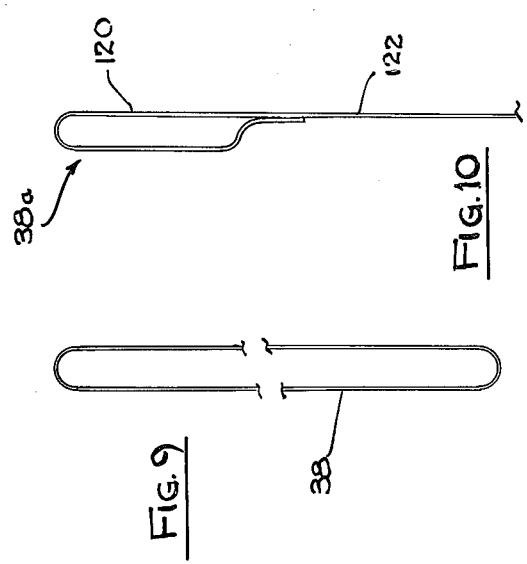
Fig. 9
Fig. 10
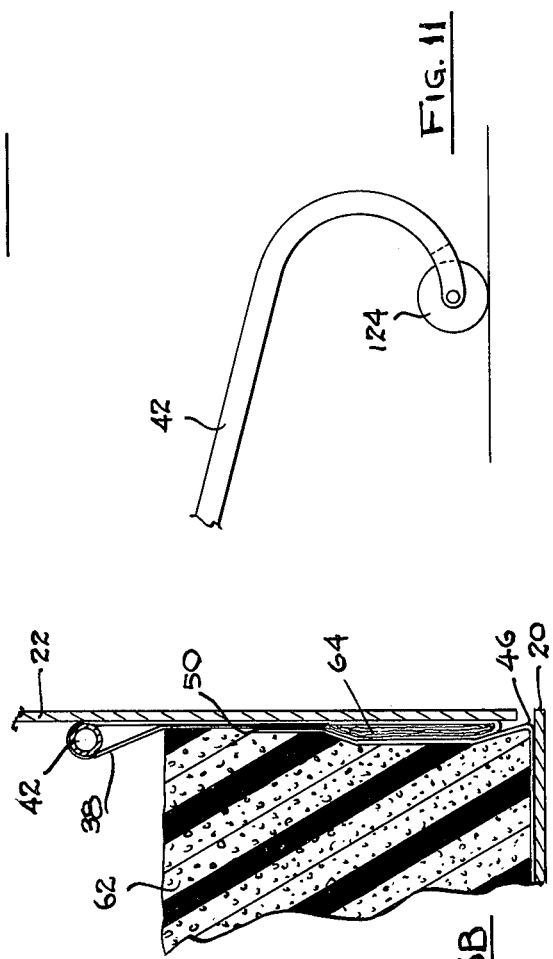
Fig. 11
Fig. 5B

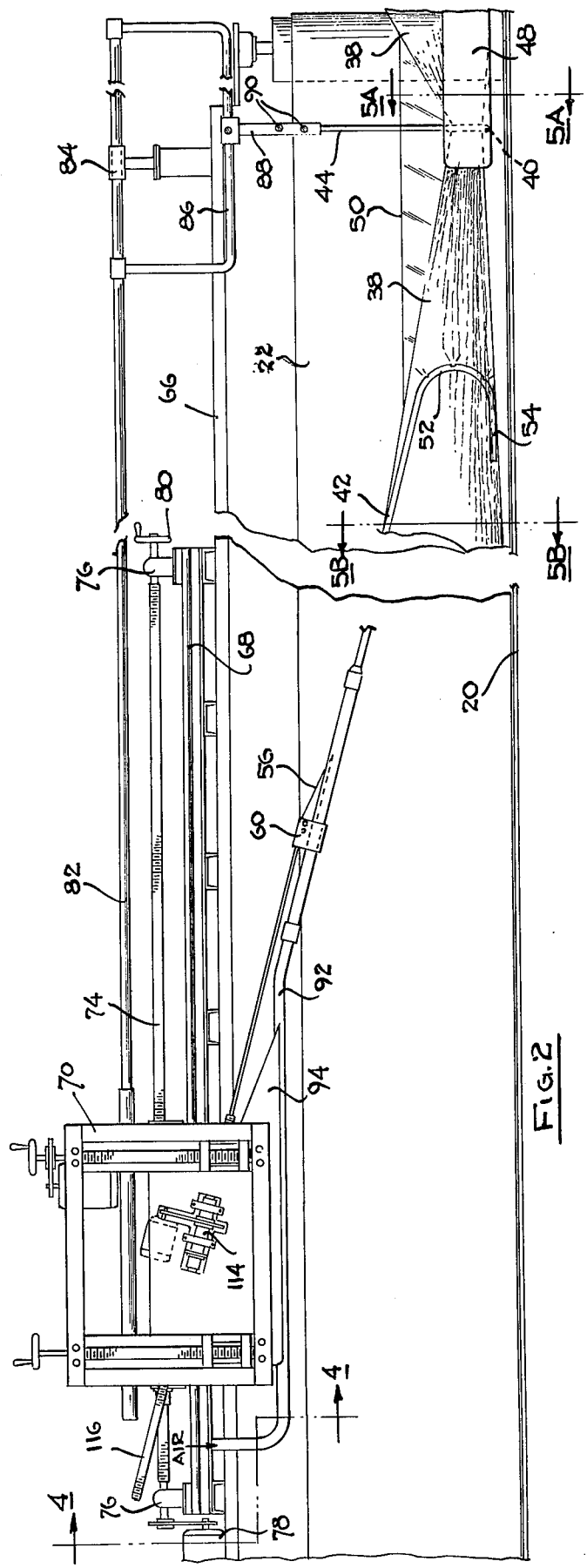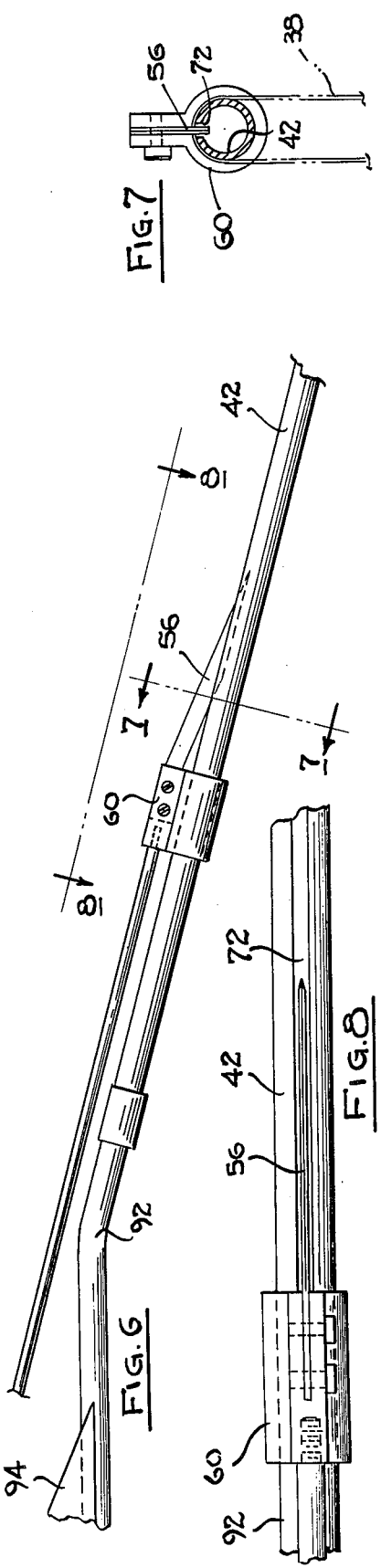

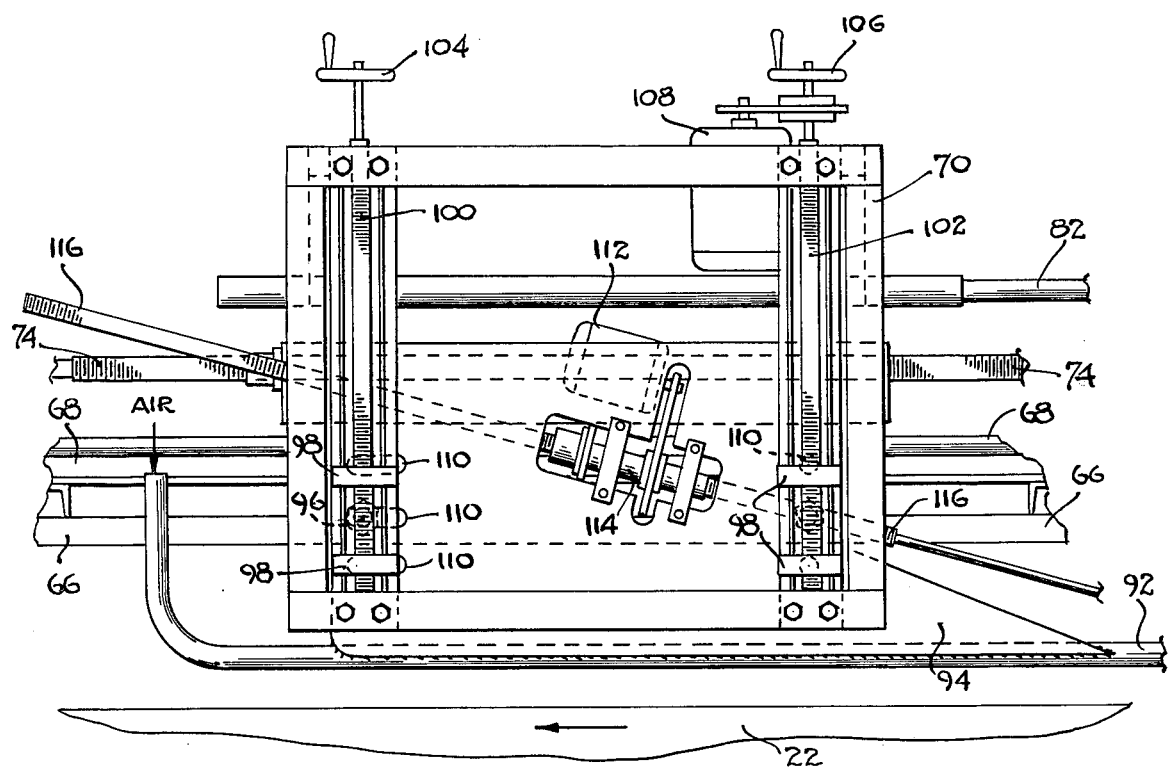
Fig. 3
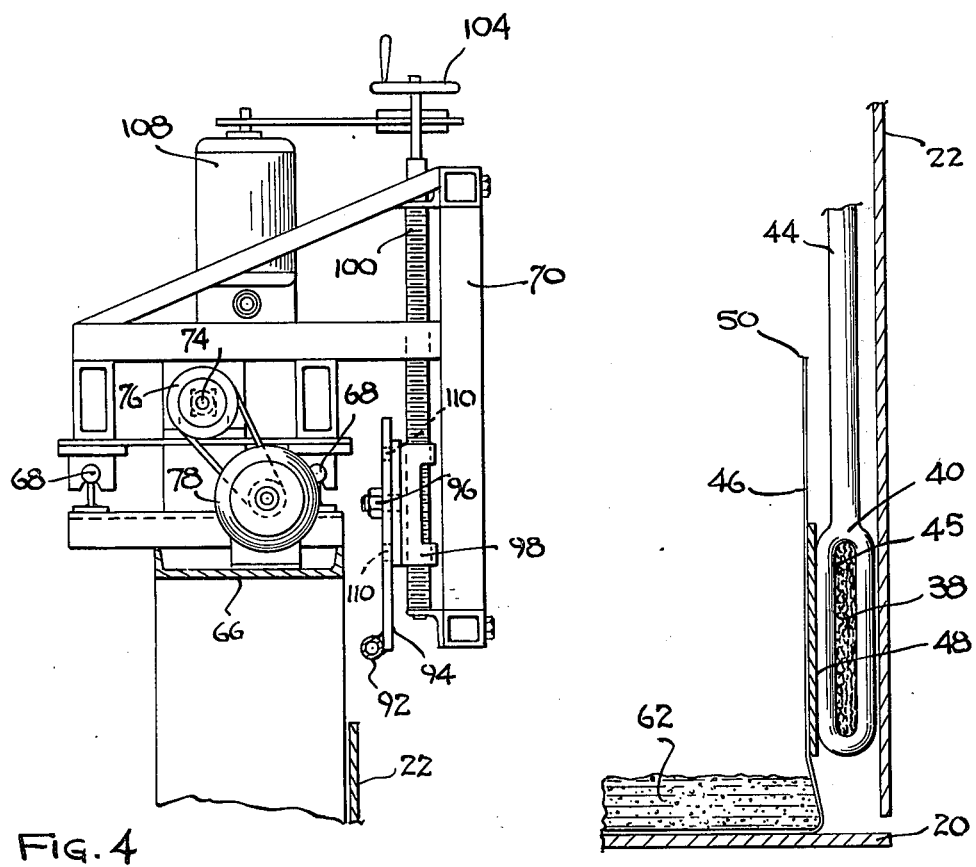
Fig. 4
Fig. 5A

METHOD AND APPARATUS FOR MAKING FLAT TOP BUNS

BACKGROUND OF THE INVENTION

1. Field of the Invention

The present invention relates to the field of continuous foaming methods and apparatus, and more particularly to methods and apparatus for achieving flat top buns in continuous, open top foaming processes.

2. Prior Art

Flexible polyurethane foam is widely used for cushioning and sound absorption in a great number of commercial and consumer applications. By way of example seat cushions, mattresses and crash-padding commonly utilize flexible urethane foam with an appropriate funcional and decorative covering thereover of cloth, vinyl or other materials. While urethane foam may be and is molded in some form of closed mold for some applications, it is common to foam the constituents in an open top mold in a continuous process to form large buns, which are then sliced into sheets or blocks of the desired size. The equipment used in such processes comprises a long conveyor system onto which is disposed a disposable material such as a polyethylene or paper film, supported by a bottom conveyor and side conveyors (or fixed sides with a moveable film), to define a generally U-shaped trough for constraining the bottom and side surfaces of the foam. The foam reactants are mixed and dispensed at one end of the trough, which quickly foam as they progress through the machine to form a long continuous bun existing from the opposite end thereof.

Without more, the apparatus hereinbefore described results in a bun similar in cross section to a loaf of bread, characterized by a rounded top surface having a much greater height at the center thereof than at the sides. Such a bun shape is highly undesirable, as the slicing of the bun into rectangular sheets or blocks results in substantial waste caused by the curvature of the top surface. Accordingly various methods and apparatus have been devised which tend to provide a much flatter top surface of the bun without constraining the free rise of the foam.

It is well known that the rounded top surface of a freely rising bun is caused primarily by viscous effects between the rising foam material and the sidewalls defining the trough within which foaming is occurring. Accordingly, various techniques and apparatus have been devised for at least temporarily defining sidewalls effectively rising with the foam to negate the viscous effects adjacent the sidewall, and to encourage the free rise of the sides of the bun to the same extent as is encountered at the center of the bun. While a perfectly flat top bun may not be achieved, the irregularity (curvature) of the top surface of the bun may be grossly reduced by this technique, thereby minimizing resulting waste in the subsequent slicing of the bun.

The prior art relating to processes for making flat top buns is quite extensive, as the economic incentive for achieving the desired result has been long standing and great. Of the large volume of prior art, however, certain selected prior art patents are believed most relevant both because of their specific apparatus, and for some of them because of their known commercial use.

In U.S. Pat. No. 3,091,811, apparatus and methods for molding a foam material in continuous open top molding processes are disclosed. In one embodiment, crepe paper is formed into a U-shaped channel at each side of the molding conveyor and guided first substantially longitudinally to the vicinity of the cream line, and then upward at a predetermined angle in accordance with the rise and linear progression of the reactants. When the foam has nearly reached its full height, the strips of crepe paper continue upward and are drawn out of the conveying trough. In another embodiment, large discs supported on a common horizontal shaft are disposed at each side of the trough adjacent the cream line and caused to rotate, thereby defining an upward component at the sides of the trough during foaming. It will be noted in both of these embodiments that the item or material defining the upward component of velocity during foaming is contemplated as being removed from the trough as the foaming mass approaches its full rise, which would require a very heavy material to allow its being pulled away from the foam mass, and which normally would cause considerable scarring of the sides of the bun, thereby achieving the desired flat top characteristic at the expense of substantial waste at the sides of the bun. This patent, however, does disclose the basic concept of defining upward progressing sidewalls in the foaming region to achieve the desired result, though until now, the problem has remained as to how to achieve the result on a production basis in a simple, low-cost and highly reliable manner.

In Japanese Pat. No. 41-17667, rolls of suitable sheet material are disposed at each side of the trough, with material dispensed from the rolls being directed first horizontally and then upward along the desired trajectory along the conveyor. The horizontal component of the trajectory is defined, or more appropriately maintained, by toothed wheels adjacent the foam line rotating about substantially vertical axes and firmly engaging the material so as to limit its direction up to that point. Thereafter the material proceeds upward along a trajectory defined by a pair of rollers encouraging the material upward and on out of the foaming trough. The system contemplates a rather narrow strip of material being used at each side of the trough, which strip, as already mentioned, continues upward to be separated from the bun adjacent the region of near maximum rise thereof.

U.S. Pat. Nos. 3,719,734 and 3,751,197 disclose methods and apparatus to achieve flat top buns in a continuous process by the guiding of relatively wide plastic sheets longitudinally to the cream line, then upward in accordance with the foaming rate for release at a point adjacent the region of full expansion of the reactants. The system utilizes, adjacent each side wall, a continuous chain having a plurality of individual grippers to grip the plastic sheets adjacent the top thereof and to define the upward directed trajectory, resulting in a relatively mechanically complex system and requiring relatively thick plastic sheets or films so as to respond to the grippers without stretching or tearing.

U.S. Patent Nos. 3,809,512 and 3,812,227 also disclose methods and apparatus for continuous molding of flat top buns utilizing plastic sheets of relatively wide material having an upward trajectory in the foaming region. This system utilizes a fold-bar at the bottom of the trough somewhat downstream of the foam line over which a downward proceeding plastic film is directed so as to redirect the sheet along the desired upward trajectory defined by the pinch rollers engaging the top edge of the film adjacent the point of maximum foam rise. While the system appears relatively simple, control of the foldbar and the mechanism assuring proper rise of the plastic sheet along the trajectory are critical, and a relatively strong plastic sheet is required because of the local mechanical stresses created by the rollers defining the upward trajectory. In practice, tape reinforcement of the film edge is required. In this regard it should be noted that any system which does not gently but positively define the trajectory of the plastic sheet along the full length of the foaming region, but only defines that trajectory by rollers or other devices at the end points thereof, will necessarily require a much stronger plastic sheet because of the tension and concentration of stresses therein at the local points of support. Also, since the fold bar projects well beyond the cream line, scarring of the resulting bun may be caused thereby.

U.S. Pat. Nos. 3,768,937 and 3,875,276 disclose a method and apparatus for achieving the desired result using continuous tubular shaped plastic films at each side of the trough. The films are directed in a downward and forward trajectory off of rolls, with a guide plate inserted into each tubular member during the downward portion of the trajectory to maintain the basic tubular shape. The guide plates are folded about a horizontal line in the region of the cream line so as to define the desired upward directed trajectory starting approximately at the cream line. A cross section of each guide plate in the region of the fold is an approximate U-shape, with another plate extending downward between the legs of the U-shape to assure the desired contour and motion of the tubular member in that region. The tubular members proceed along the desired upward directed trajectory (defined by the guide plates) through the foaming region, with friction being minimized by plastic coatings on the guide plates and by the injection of air along the "leading edge" thereof. The tubular members are slit adjacent the region of maximum rise so as to freely proceed longitudinally with the cured bun outward through the machine. Adjustments are provided for the longitudinal position of the guide plates, though other parameters of the system appear to be nonadjustable. While this system has been used commercially, the friction encountered in the region of the fold of each guide plate generally requires the use of a relatively thick plastic film for the tubular members, and then the mechanical complexity and lack of adjustment therein prevents "fine tuning" of the system to achieve optimum results under varying conditions. Furthermore, the thickness of the assembly in the region of the foam line and for some distance thereafter, and perhaps other reasons, causes considerable scarring on the sides of the bun, thereby creating an additional source of waste.

BRIEF SUMMARY OF THE INVENTION

A method and apparatus for making flat topped foam buns, such as polyurethane, in a coninuous foaming process. The method comprises the guiding of a continuous thin film tubular member through an eye-like gathering device substantially adjacent the area of the cream line at each side of a conveyor, and subsequently guiding the tubular members upward along a guide bar at an angle and rate determined in accordance with the rate of longitudinal travel and the rate of rise of the foaming reactants so as to encourage the sides of the bun into the same height of rise as the center region of the bun. Continuous slitting of the tubular members at the appropriate elevation allows the material thereof to progress longitudinally with the cured bun.

The use of simple eye-like guides or other equivalent gathering means substantially adjacent the cream line, together with the simple guide bar defining the subsequent trajectory of the tubular member has been found in practice to provide the desired result in a trouble-free manner, utilizing thin-film materials and resulting in a minimum of scarring at the sides of the cured bun. Adjustability in the vertical and horizontal positions of the gathering members and the guide bars, in the angle of the guide bars, and in the position of the slitting knives along the guide bars provides sufficient adjustability to ensure optimum results.

One of the important features of the present invention is the ability to compress the height of the tubular members well below the height of the tubular members and to allow the tubular members to extend, as required, in the vertical direction without operating or manipulating the full height dimension of the tubular members and/or causing high tension at the bottom of the material which is normally present when changing direction of the material, such as when the full height of the material is being pulled upwardly. Also, in the preferred embodiment the tubular material is compressed or gathered to a height substantially below the full height required for full rise of the foam as the outer surfaces of the tubular material pass through or under the gathering means and progress longitudinally upward, as required, by the movement of the bun through the conveyor system.

BRIEF DESCRIPTION OF THE DRAWINGS

FIG. 1 is a top view of a portion of a typical pouring machine for the continuous open top molding of foam materials.

FIG. 2 is a side view of the machine of FIG. 1.

FIG. 3 is a view taken on an expanded scale of a portion of FIG. 2.

FIG 4 is a partial cross section taken along line 4—4 of FIG. 2.

FIG. 5a is a cross section taken along line 5a—5a of FIG. 2.

FIG. 5b is a cross section taken along line 5b—5b of FIG. 2.

FIG. 6 is a view taken on an expanded scale of a portion of a guide bar assembly.

FIG. 7 is a cross section taken along line 7—7 of FIG. 6.

FIG. 8 is a top view taken along line 8—8 of FIG. 6.

FIG. 9 is a typical cross section of each of the tubular film members 38.

FIG. 10 is a typical cross section of an alternate form of tubular member which may be used with the present invention.

FIG. 11 is a side view of a lower portion of an alternate form of guide bar for use with the present invention.

FIG. 14b is a cross section taken along line 14b—14b of FIG. 14a.

DETAILED DESCRIPTION OF THE INVENTION

Figure 12:
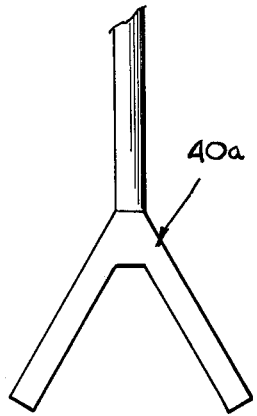
FIG. 12 is a face view of an alternate gathering means for the tubular film in the general shape of a fork-like member which may be used with the present invention.
Figure 13:
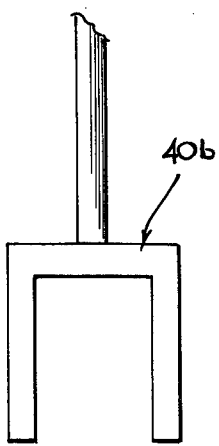
FIG. 13 is a face view of an alternate gathering means for the tubular film in the general shape of a channel-like member which may be used with the present invention.

First referring to FIG. 1, a top view of a typical pouring machine for the open molding of polyurethane foams, with the present invention mounted thereon, may be seen. The pouring machine has a main, substantially horizontal or slightly inclined conveyor 20 and a pair of side conveyors 22 for defining a U-shaped trough though the machine. Adjacent one end of the horizontal or bottom conveyor 20 and mounted thereabove is a pouring head 24 supported by a support structure 26 so as to oscillate back and forth across the width of the conveyor 20 to uniformly dispense the mixture of foaming reactants onto the conveyor. In operation, typically a sheet or film of plastic (typically polyethylene) or paper having a width somewhat wider than conveyor 20 is dispensed from a roll thereof onto the conveyor 20, prior to the pouring head 24. The side edges of the film are turned upward a predetermined amount to confine the fluid reactants at the side of conveyor 20 adjacent the pouring head. For clarity, the apparatus for dispensing this main sheet of plastic or paper film is not shown in FIG. 1, but is well known in the prior art and is commonly used with substantially all equipment for forming flat top buns in a continuous process. As shall subsequently be seen, the extent to which this polyethylene or paper sheet is turned upward at the side in the region of the side conveyors 22, that is, the height of the legs of the U-shaped trough formed by this polyethylene or paper sheet in the region between side conveyors 22, is a relevant parameter in the present invention. For purposes of discussion, the main sheet in the preferred embodiment will be referred to as being made of polyethylene although paper or other plastic sheets or film could be used.

In a typical installation, the bottom conveyor 20, supported at the forward end by roller 28, extends forward further than the side conveyors 22 supported by rollers 30, as foaming does not commence immediately upon disbursement of the reactants onto the conveyor. In fact, in relation to FIG. 1, foaming begins approximately at the cream line 32, after which the foam rises at a relatively uniform rate until the maximum rise thereof is attained, approximately at line 34.

At each side of the apparatus of FIG. 1 is a roll 36 of tubular shaped polyethylene film 38. (A typical cross-section of the film is shown in FIG. 9, though the relative thickness is grossly exaggerated for clarity.) The tubular members are each guided downward and compressed through an eye member 40, and then upward over guide-bars 42, which determine the rate of rise of the tubular members in the foaming region. The tubular members are slit and separated from the guide-bars 42 just before the region of maximum rise 34. Further details of the structure, arrangement and function of these various elements of the present invention, and of various adjustments provided with the present invention, some of which are visible in FIG. 1, will be more particularly described with respect to the remaining FIGURES.

Figure 15:
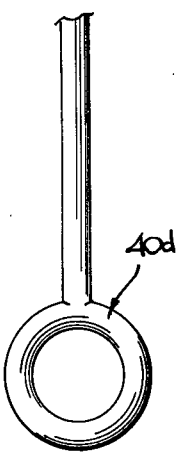
FIG. 15 is a face view of an alternate gathering means for the tubular film in the general shape of a circular member which may be used with the present invention.
Figure 14A:
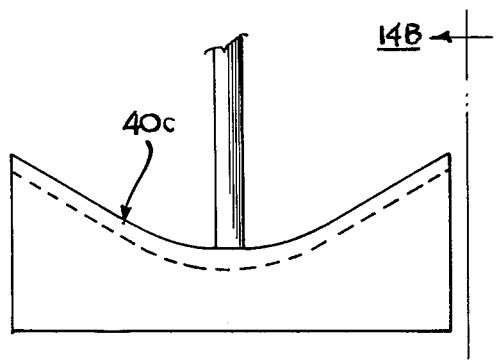
FIG. 14a is a side view of an alternate gathering means for the tubular film in the general shape of a hollow tunnel which may be used with the present invention.
Figure 14B:
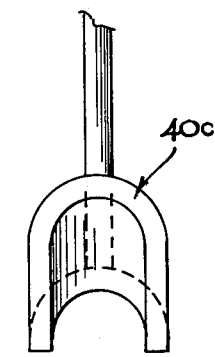
Figure 16:
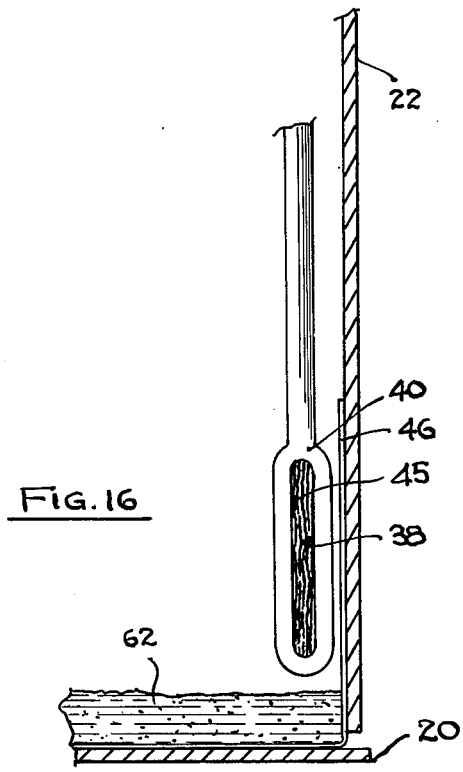
FIG. 16 is a cross-section of an alternate embodiment taken along the equivalent of line 5a—5a of the pouring machine shown in FIG. 2.

Referring now to FIG. 5a, a face view of one of the eye-like members 40 for gathering and compressing may be seen. As will be described hereinafter, the preferred embodiment uses elongated eye-like members 40; however, various other shaped members can be used to gather or compress the tubular members. (See FIGS. 12 - 15, inclusive) The eye member, integrally supported on a vertical rod 44, has an elongated opening 45 through which the tubular polyethylene tube is directed. While a round opening, such as shown in FIG. 15, could be used, an elongated opening is usually preferred, as it minimizes the width of the eye member required for the passage of a polyethylene tube of given dimensions, and tends to more uniformly gather and pleat the polyethylene tube in the vertical direction. The eye member 40 is disposed just inward from the adjacent side conveyor 22, and is separated from the main polyethylene trough defining film 46 by a side guide plate 48 (see FIG. 1). The line representing the top edge 50 of the film 46 may also be seen in FIG. 2. It will be noted from both FIG. 2 and FIG. 5a that the eye member 40 directs the tubular film 38 downward through the eye member at an elevation substantially below the top edge 50 of the main polyethylene trough, thereby effectively gathering the entire tubular member between the side of the trough defined by the main film 46 and the side conveyor 22 for subsequent vertical withdrawal at a rate which may be chosen and adjusted to achieve the result desired. By "gathering means" and "means for gathering" as hereinafter used is meant a member having an "opening" as shown in FIGS. 12, 13, 14A, 14B, 15 and 16 and obvious equivalents thereof for causing a random pleating as described below. For the purposes of this application on the spacies between the legs of the U or V-shaped members as shown in FIGS. 12, 13, 14A and 14B are considered "openings" as obviously are the apertures within the members shown in FIGS. 15 and 16.

The gathering achieved by the eye member 40, because of the elongated opening therein and the general vertical orientation both of the elongated opening and the plane of the tubular members as they come off the supply rolls, is a rather randomly organized gathering or pleating, somewhat resembling the gathering or pleating of drapes as they are opened, as opposed to the mere irregular forcing or stuffing of the tubular members into the desired area. Because of this somewhat orderly gathering and compression, an associated orderly withdrawal thereof is achieved.

This may be seen in FIG. 5b, which is a cross section taken along 5b—5b of FIG. 1 and illustrates the relative disposition of the foaming reactants at a typical position within which foaming is occurring. In this region the foaming reactants 62 have expanded to a level exceeding the elevation of the top 50 of the main trough defining film 46, and are partially engaging the surface of the tubular member 38. The tubular member 38 is slowly being withdrawn from the region between film 46 and the side conveyor 22 by the sloping guide bar 42 to encourage the sides of the rising foam to a height equal to the free rise of the center of the foam mass. Because of the uniform gathering and compression hereinbefore described, the tubular members 38 are quite regularly and uniformly withdrawn as they proceed along the sloping length of the guide bars without any tendency to bunch or bind between the side conveyor 22 and the film 50. In that regard it should be noted that for purposes of clarity, film thicknesses have been greatly exaggerated in FIG. 5b, though in practice it has been found that film thicknesses of polyethylene for the tubular members 38, unlike the prior art, may be as low as about 1 mil, so that even multiple thickness thereof in the region 64 are still only a very small fraction of an inch thick. Obviously the use of films as thin as one mil to provide highly reliable operation without requiring any additional reinforcement such as tape, etc. results as substantial savings over the systems of the prior art.

Now referring again to FIG. 2, certain details of the guide bars 42 may be seen. Each guide bar extends downward to the approximate vicinity of the cream line 32, having a hook-like region 52 at the lower end thereof so as to define a streamlined "leading edge" for smooth penetration into the respective tubular member, with a lower portion 54 extending to a position adjacent and parallel to the lower conveyor 20 to assure that the lower portions of the tubular members ride well down below the top edge 50 of the main trough defining film. It should be noted that the orderly gathering of the tubular members by the eye members 40 assures the free passage of the tubular members over region 52 of the guide bars without any tendency of binding or hang-ups of any kind in this area. The preferred guide bars 42 are generally tubular members, and may be provided with small openings along the leading edge thereof through which air may be directed, thereby providing a tendency of blowing the tubular members toward an open condition. It has been found however, that the use of air is not required to avoid binding in this region, though may be desirable not only as an extra safeguard, but also because of its tendency to reduce the static electricity build-up which may be encountered with thin polyethylene films. In any event, the guide bars 42 in the preferred embodiment are teflon coated to provide a self-lubricating tendency. The preferred guide bars 42, as discussed above, are hollow tubular members which provide a light weight easily adjustable member, however, solid guide bars may be used, as well as guide bars having other than circular cross sections. (e.g., rectangular, elliptical, etc.)

Each guide bar 42 is adjustably inclined at an angle approximating the resultant of the velocity of the reactants through the foaming machine and the rate of rise thereof, or more appropriately, at an angle which in practice results in the optimum flat top bun. Adjacent the upper portion of each of the guide bars 42 is a knife blade 56 supported by a collar 60 and guided by an appropriately disposed slot in the guide bar for continuously slitting the tubular member in this region to allow it to progress longitudinally outward with the bun. As may be best seen in FIGS. 6, 7 and 8, the collar 60 slides on the guide bar 42 with the blade 56 sliding therewith within a slot 72 in the guide bar to provide adjustability in the position of the knife blades, generally within the vicinity of the region of maximum rise 34 (see FIG. 1). As a result of this specific structure, in comparison to that of U.S. Pat. Nos. 3,809,512 and 3,812,227, no substantial side disturbance (e.g., in a lateral direction) is caused in the region of foaming. This, together with the accurately controllable release of the tubular members by adjustment of the knife blades, results in a minimum of scarring or streaking of the side of the buns in comparison to the prior art apparatus and methods.

Now referring to FIG. 4, a cross section taken along line 4—4 of FIG. 2 may be seen. Mounted to a frame member 66 at each side of the pouring machine are a pair of parallel spaced apart rails 68, with a carriage assembly 70 having open ball bushings thereunder engaging the rails for longitudinal motion parallel to and at the side of the trough. The longitudinal position of each carriage assembly is determined by a lead screw 74 (see FIGS. 2 and 3) supported on bearings 76 coupled to the frame of the pouring machine, and a lead screw follower coupled to the carriage assembly itself. The lead screw 74 in the preferred embodiment is driven by motor 78 (FIG. 2) to allow remote adjustment in the longitudinal position of the carriage, though a hand wheel 80 is also provided for manual adjustment if desired. (A torque limiter on the motor drive allows the hand wheel drive to override the motor drive.) Coupled to the carriage assembly 70 is a bar 82 projecting forward toward the pouring region, with a slide support 84 stabilizing the bar adjacent its remote end. Extending down therefrom is a yoke-like member 86 supporting a downward directed tube 88 providing a slipfit over the bar 44 supporting the eye member 40. A pair of locking screws 90 allow the locking of the eye member at the desired vertical position with respect to the lower conveyor 20. Thus the eye member is vertically adjustable as desired, and longitudinally adjustable in unison with the carriage assembly which, as shall subsequently be described, also supports the guide bar 42.

As may be seen in FIG. 3, the upper end 92 of the guide bar 42 is fastened to a vertically disposed support plate 94 (see also FIG. 4), which in turn is bolted by bolts 96 to lead screw followers 98. The carriage assembly 70 supports a pair of lead screws 100 and 102, having hand wheel drives 104 and 106 and a motor drive 108. The lead screws 100 and 102 are vertically disposed and spaced apart in a fore and aft relationship so that rotation of both in unison raises and lowers the guide bar 42 as desired, with differential rotation of the lead screws providing adjustment in the angle of inclination of the guide bar 42. (In the preferred embodiment, multiple bolt holes 110 provide a selection of nominal positions for the guide bar around which the adjustability is provided.) Also mounted on the plate 94 is a motor 112 driving a lead screw follower 114 engaging a lead screw assembly 116 coupled to the collar 60 and knife blade 56. This provides a remote control for the relative position of the slitting knives along each of the guide bars 42 for adjustment in accordance with the maximum rise of the reactants. The net result is that adjustability is provided for all important parameters determining the proper positioning of the side plastic film sheet material forward of the foam line, the position at which the film is initially withdrawn along its upward trajectory, the angle of the upward trajectory and the point at which the upward trajectory is terminated adjacent the region of maximum rise of the foaming mass. The tubular members 38 have been generally referred to as being preferably made of polyethylene, however, it should be clearly understood that any nonrigid and easily foldable tubular or looped member can be used, such as polypropylene, paper, fabric, etc.

It has been found that for optimum results in obtaining flat top polyurethane buns the tubular members 38 should be slit at the position of about 80% to 90% of the maximum rise of the reactants. The position of slitting the member 38 directly effects the shape and profile of the sides of the buns and therefore, should be adjusted as required.

Now referring to FIG. 10, a cross section of an alternate form of tubular member for the polyethylene tubes 38 may be seen. In this embodiment the tubular member, generally indicated by the numberal 38a, is comprised of a generally loop shaped or tubular shaped section 120 adjacent to the upper portion thereof, with a single downward directed sheet or film region 122 integrally coupled thereto. The tubular region 120 need only be as large as is required to at least loosely fit over the guide bars 42, with the sheet region 122 extending the height of the tubular region to give the overall height desired. Of course, if desired, the lower regions 52 and 54 of the guide bars 42 may be reconfigured to allow for a smaller tubular region 120, though in practice it has been found that the full tubular member 38 as shown in FIG. 9, together with the guide bars as shown, is most easily procured and presents no difficulties in use.

In the embodiment hereintofore described the lower portions 54 of guide bars 42 are generally disposed at some elevation just off of the main trough defining film 46. If desired, however, a small roller or wheel 124 may be coupled to the lower end of the guide bars as shown in FIG. 11. This will stabilize the lower end of the guide bars without creating any drag on the tubular member 38 or on the main trough defining film 46, as the tubular members 38 and the trough defining film 46 are generally proceeding in unison at this point.

The preferred embodiment described above utilizes an elongated eye member 40 for purposes of gathering and guiding the tubular members 38 and compressing the height of such tubular members well below their full height to provide sufficient slack so that when the top of the tubular members are directed upwardly as required, adjacent the foaming region, such tubular members will be uniformly fed in an organized and linear manner without having to manipulate the entire height of the tubular members and without causing high tension in the bottom portion of the tubular members. The gathering means, as shown and described herein, greatly aids in providing a flat top bun which has smooth unscarred side surfaces because of the manner in which the tubular members 38 are handled and raised in the foaming region. FIGS. 12, 13, 14a, 14b and 15 illustrate some alternate gathering means which may be used in lieu of eye member 40. FIG. 12 illustrates a fork-like member 40a, FIG. 13 a channel-like member 40b, FIGS. 14a and 14b a tunnel-like member 40c and FIG. 15 a circular member 40d. Any device or devices either open ended or closed, which temporily gathers and compresses the vertical extent of the tubular or sheet members, as previously discussed, can be utilized. A full pleating guide could be used although such is not normally required since the gathering achieved with the above described gathering means is sufficiently ordered. It should be understood that the supply rolls 36 of tubular material can be positioned, as required, (e.g. at an angle) to conveniently feed the tubular members 38 through the gathering means. Preferably, the supply rolls should be positioned so that the tubular material is fed uniformly and longitudinally through or by the gathering means.

While the various gathering means have been described in combination with the over-all invented structure shown in the annexed drawings, such gathering means could be used to great advantage in the various prior art devices where problems relating to handling and raising tubular or sheet materials adjacent the foaming region are present and in systems where side scarring is prevalent because of the manner in which the tubular members are fed into the conveyor. For example, the fold bars in U.S. Pat. Nos. 3,809,512 and 3,812,227 could be replaced by the gathering means disclosed herein. Also, the present gathering means could be used in the apparatus of Japanese Pat. No. 41-17667 in lieu of rollers 7 and 7' and would allow the use of taller sheet material 5.

The preferred embodiment shows the tubular members 38 being fed through the gathering means 40 on the outside surfaces of the film 50; (See FIG. 5a) however, it is also possible to feed the tubular members 38 through the gathering means adjacent the inside surface of the unturned portions of the main film 50 (See FIG. 16). The main disadvantage to having the tubular members inside the film 50 is caused by the liquid nature of the reactants in the region where the gathering means are normally located which may cause some leakage problems around the outer surfaces of the tubular members 38 and the subsequent formation of foam material on the outside surface of the tubular members 38 which may interfere with the operation of the foam producing conveyor system.

There has been described herein a new and unique method and apparatus for achieving flat top foam buns, such as polyurethane buns, in continuous open top molding processes. The preferred method and apparatus utilize tubular members which are gathered between the sides of the main trough defining film and the side conveyors (or other side confining surfaces) for subsequent guidance over a guide bar for vertical withdrawal at a rate selected to provide the flat top bun results desired. In accordance with the forms of tubular members or tubular films described herein, the word tubular has been used herein and will be used in the claims in a general sense to refer to film members having at least a portion thereof in a tubular or looped shape for retention by a simple guide bar or plate prior to the slitting or opening of the tubular member. While the preferred embodiment utilizes the full tubular member, a member having a tubular section adjacent one edge thereof and a film extending therefrom may also be used if desired. Also, the novel gathering means disclosed herein may be used with non-tubular sheet materials in other systems which require handling and raising sheet materials at the sides of a continuous open top molding process to eliminate the formation of domed buns caused by the viscous effects at the sides of the foam producing apparatus. Thus, while the preferred embodiment and method of practicing the present invention have been disclosed and described in detail herein, it will be understood by those skilled in the art that various changes in form and detail may be made therein without departing from the spirit and scope of the invention.

I claim:

1. In apparatus for obtaining molded products in continuous open molding equipment having a conveyor system defining an open top trough in which is disposed a main film member formed to have a bottom and two side regions to cover the bottom and at least part of the side walls defining the trough onto which foam reactants are dispensed to react in a foaming region to form a continuous bun as the main film member along the conveyor system, the improvement comprising:
supply means for supplying tubular film members, each having at least a tubular portion, adjacent each side of said trough adjacent the region said foam reactants are dispensed;
means for gathering each of said tubular film members adjacent a lower portion of said side regions of said main film member and the respective said side wall defining the trough;

guide means adjacent each side of said conveyor system, each of said guide means being a means for extending into a respective one of said tubular members and for guiding the top thereof along an upwardly inclined trajectory adjacent said foaming region; and means for opening each of said tubular members adjacent the end of said foaming region to allow separation of said tubular members from said guide means.

2. The apparatus of claim 1 wherein each of said gathering means compresses the vertical extent of the tubular members adjacent the lower portion of the respective said side wall upon passage of a respective one of said tubular members thereby.

3. The apparatus of claim 2 wherein each said gathering means defines a vertically oriented elongated opening.

4. The apparatus of claim 3 wherein said supply means comprises means for supplying said tubular film members from supply rolls of tubular film having a substantially vertical axis.

5. The apparatus of claim 2 further comprised of means for directing said side regions of said main film member past each of said gathering means.

6. The apparatus of claim 1 wherein said means for opening each of said tubular members adjacent the end of said foaming region comprises a knife blade coupled to each of said guide means, each of said knife blades being adjustable in position along the respective guide means.

7. The apparatus of claim 1 further comprised of means for adjusting said guide means for changing the angle of said upwardly inclined trajectory defined thereby.

8. The apparatus of claim 1 wherein the elevation of said guide means and the position of said guide means along the path of travel of said conveyor system are each adjustable.

9. The apparatus of claim 2 wherein the elevation of said gathering means is adjustable.

10. The apparatus of claim 7 wherein said means for opening each of said tubular members adjacent the end of said foaming region comprises a knife blade coupled to each of said guide means, each of said knife blades being adjustable in position along the respective guide means.

11. The apparatus of claim 1 in which said gathering means are disposed between one of said side regions of said main film member and the respective side wall defining the trough.

12. The apparatus of claim 1 in which said gathering means are disposed within said side regions of said main film member.

13. In apparatus for obtaining molded products in continuous open molding equipment having a conveyor system defining an open top trough in which is disposed a main film member formed to have a bottom and two side regions to cover the bottom and at least part of the side walls defining the trough onto which foam reactants are dispensed to react in a foaming region to form a continuous bun as the main film member proceeds along the conveyor system, the improvement comprising:

supply means for supplying tubular film members having an approximately vertical orientation adjacent each side of said trough and adjacent the region said foam reactants are dispensed;

means adjacent each side of said conveyor system for gathering each of said tubular film members, upon passage therethrough;

a guide member adjacent each side of said conveyor system, each of said guide members being disposed for extending into a respective one of said tubular members and for guiding the top thereof along an upwardly inclined trajectory adjacent said foaming region; and slitting knives for opening the upper region of each of said tubular members adjacent the end of said foaming region to allow separation of said tubular members from said guide members.

14. The apparatus of claim 13 wherein each of said gathering means compresses the vertical extent of the tubular members adjacent the lower portion of the respective said side wall upon passage of one of said tubular members thereby.

15. The apparatus of claim 13 wherein said gathering means defines a vertically oriented elongated opening.

16. The apparatus of claim 13 in which said gathering means are disposed between one of said side regions of said main film member and the respective side wall defining the trough.

17. The apparatus of claim 13 in which said gathering means are disposed within said side regions of said main film member.

18. The apparatus of claim 13 wherein said guide members are tubular guides.

19. The apparatus of claim 13 further comprised of means for directing said side regions of said main film member past each of said means for gathering each of said tubular members.

20. The apparatus of claim 13 further comprised of means for adjusting said guide members for changing the angle of said upwardly inclined trajectory defined thereby.

21. The apparatus of claim 20 wherein the elevation of side guide members and the position of said guide members along the path of travel of said conveyor system are each adjustable.

22. The apparatus of claim 21 wherein the elevation of said means for gathering each of said tubular members is adjustable.

23. The apparatus of claim 13 wherein each of said knife blades is adjustable in position along the respective guide members.

24. A method for obtaining flat top molded products in continuous open molding equipment having a conveyor system defining an open top trough in which is disposed a main film member formed to have a bottom and two side regions to cover the bottom and at least part of the side walls defining the trough onto which foam reactants are dispensed to react in a foaming region to form a continuous bun as the main film member proceeds along the conveyor system, comprising the steps of:

a. providing continuous thin film tubular members of a given height, each having at least a tubular region adjacent one edge thereof, adjacent each side of the trough;

b. gathering each of the tubular members in the area substantially adjacent a lower portion of said side regions of the main film and the respective side wall of the conveyor system; by passing each said member through an opening in a gathering means c. drawing at least a part of each tubular member upward in the foaming region to encourage the side regions of the foaming reactants in contact therewith upward by the passage of each tubular member over an inclined guide; and d. Slitting the tubular member substantially adjacent the region of maximum rise of the reactants so as to separate the tubular member and the guide.

25. The method of claim 18 in which each tubular member is temporily compressed to the height substantially less than said given height prior to drawing each tubular member upward in the foaming region.

26. The method of claim 24 wherein the tubular members are slit at the position of approximately 80% to 90% of the maximum rise of the reactants.

27. A method for obtaining flat top molded products in continuous open molding equipment having a conveyor system defining an open top trough in which is disposed a main film member formed to have a bottom and two side regions to cover the bottom and at least part of the side walls defining the trough onto which foam reactants are dispensed to react in a foaming region to form a continuous bun as the main film member proceeds along the conveyor system, comprising the steps of:

a. providing continuous thin film members adjacent each side of the trough;

b. gathering each of the thin film members to substantially reduce the height of each of the thin film members; by passing each said film member through an opening in a gathering means c. disposing each of the gathered thin film members adjacent the side regions of the main film member;

d. drawing each thin film member upward in the foaming region to encourage the side of the foaming reactants in contact therewith upward; and e. releasing each of the thin film members adjacent the region of maximum rise of the reactants.

28. The method of claim 27 wherein step (d) is accomplished at the point of approximately 80% to 90% of the maximum rise of the foaming reactants.

29. The method of claim 27 wherein step (c) comprises the step of disposing each of the gathered thin film members within the side regions of the main film member.

30. The method of claim 27 wherein step (c) comprises the step of disposing each of the gathered thin film members between one of the side regions of the main film member and a respective one of the side walls defining the trough.

31. The method of claim 27 wherein step (b) is accomplished by passage of the thin film members through elongate, generally vertically oriented openings in appropriately disposed guides.

32. The method of claim 27 wherein step (c) is accomplished by guiding substantial parts of the upper edges of the thin film members adjacent the foaming region.

33. Apparatus for obtaining flat top molded products in continuous open molding equipment having a conveyor system defining an open top trough in which is disposed a main film member formed to have a bottom and two sides regions to cover the bottom and at least part of the side walls defining the trough onto which foam reactants are dispensed to react in a foaming region to form a continuous bun as the main film member proceeds along the conveyor system, comprising;

means for providing continuous thin film members adjacent each side of the trough;

means for gathering each of the thin film members to substantially reduce the height of the thin film members;

means for disposing each of the gathered thin film members adjacent the side regions of the main film member;

means for drawing at least part of each thin film member upward in the foaming region to encourage the side of the foaming reactants in contact therewith upward; and means for allowing each of the thin film members to continue with the bun adjacent the region of maximum rise of the reactants.

34. The apparatus of claim 33 wherein said means for allowing each of the thin film members to continue with the bun are means for allowing each of the thin film members to continue with the bun at approximately eighty to ninety percent of the maximum rise of the foaming reactants.

35. The apparatus of claim 33 wherein said means for gathering each of the thin film members comprises guides, each defining a vertically oriented opening for passage of one of the thin film members thereby.

36. The apparatus of claim 33 wherein said means for drawing each thin film member upward comprises means for guiding at least a substantial part of the upper edges of the thin film members adjacent the foaming region through a predetermined trajectory.

* * * * *